United States Patent
Kanno et al.

(10) Patent No.: US 10,598,121 B2
(45) Date of Patent: Mar. 24, 2020

(54) CONTROL SYSTEM FOR ENGINE (71) Applicant: Mazda Motor Corporation, Aki-gun, Hiroshima (JP)

(72) Inventors: Masanobu Kanno, Hiroshima (JP); Hiroyuki Nishimura, Higashihiroshima (JP); Yoshiaki Tomita, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 148 days.

(21) Appl. No.: 16/023,165

(22) Filed: Jun. 29, 2018

(65) Prior Publication Data
US 2019/0032593 A1  Jan. 31, 2019

(30) Foreign Application Priority Data

Jul. 26, 2017 (JP) .................... 2017-144318

(51) Int. Cl.
*F02D 41/40* (2006.01)
*F02D 41/02* (2006.01)
(Continued)

(52) U.S. Cl.
CPC ........... *F02D 41/405* (2013.01); *F01N 3/021* (2013.01); *F01N 3/103* (2013.01); *F01N 3/106* (2013.01);
(Continued)

(58) Field of Classification Search
CPC .............. F01N 13/009; F01N 2570/14; F01N 2610/02; F01N 2900/0416;
(Continued)

(56) References Cited

U.S. PATENT DOCUMENTS

2007/0130919 A1* 6/2007 Lee .................... B01D 53/9431
60/286
2010/0132356 A1* 6/2010 Lee ......................... F01N 3/033
60/605.2
(Continued)

FOREIGN PATENT DOCUMENTS

JP         2016109041 A      6/2016

*Primary Examiner* — Audrey K Bradley
*Assistant Examiner* — Anthony Ayala Delgado
(74) *Attorney, Agent, or Firm* — Alleman Hall Creasman & Tuttle LLP (57) ABSTRACT

A control system for an engine is provided, which includes an engine body formed with a cylinder, a $NO_x$ catalyst, an oxidation catalyst, a PM filter, a fuel injector configured to perform a main injection and a post injection, and a controller configured to execute a $DeNO_x$ control in which the fuel injector is controlled to perform the main and post injections so that an air-fuel ratio of exhaust gas is brought close to the stoichiometric air-fuel ratio or becomes rich and fuel supplied into the cylinder by the post injection combusts therein, and a filter regenerating control in which the fuel injector is controlled to perform the main and post injections so that the air-fuel ratio becomes lean and the fuel supplied into the cylinder by the post injection causes no combustion therein, the controller executing the $DeNO_x$ control and the filter regenerating control consecutively in this order.

10 Claims, 5 Drawing Sheets (51) Int. Cl.
  *F02D 41/00* (2006.01)
  *F01N 3/10* (2006.01)
  *F01N 13/00* (2010.01)
  *F02D 41/14* (2006.01)
  *F01N 3/021* (2006.01)
  *F01N 3/20* (2006.01)
  *F01N 3/08* (2006.01)
  *F01N 3/025* (2006.01)

(52) U.S. Cl.
  CPC ......... *F01N 3/2066* (2013.01); *F01N 13/009* (2014.06); *F02D 41/0077* (2013.01); *F02D 41/028* (2013.01); *F02D 41/029* (2013.01); *F02D 41/0275* (2013.01); *F02D 41/0285* (2013.01); *F02D 41/1454* (2013.01); *F01N 3/0253* (2013.01); *F01N 3/0814* (2013.01); *F01N 3/0842* (2013.01); *F01N 2570/14* (2013.01); *F01N 2610/02* (2013.01); *F01N 2900/0416* (2013.01); *F01N 2900/1606* (2013.01); *F01N 2900/1614* (2013.01); *F02D 41/009* (2013.01); *F02D 41/0055* (2013.01); *F02D 2200/0806* (2013.01); *F02D 2200/0812* (2013.01); *F02D 2200/0818* (2013.01); *F02D 2200/602* (2013.01)

(58) Field of Classification Search
  CPC ..... F01N 2900/1606; F01N 2900/1614; F01N 3/021; F01N 3/0253; F01N 3/0814; F01N 3/0842; F01N 3/103; F01N 3/106; F01N 3/2066; F02D 2200/0806; F02D 2200/0812; F02D 2200/0818; F02D 2200/602; F02D 41/0055; F02D 41/0077; F02D 41/009; F02D 41/0275; F02D 41/028; F02D 41/0285; F02D 41/029; F02D 41/1454; F02D 41/405
  See application file for complete search history.

(56) References Cited

U.S. PATENT DOCUMENTS

2012/0198824 A1* 8/2012 Nishioka ............... F01N 3/0253
    60/297
2014/0090360 A1* 4/2014 Wilson .................. F01N 3/208
    60/274

* cited by examiner

CONTROL SYSTEM FOR ENGINE

TECHNICAL FIELD

The present disclosure relates to a control system for an engine provided with a $NO_x$ catalyst, an oxidation catalyst, and a particulate matter (PM) filter in an exhaust passage where exhaust gas of the engine flows.

BACKGROUND OF THE DISCLOSURE

Conventionally, a $NO_x$ catalyst of a $NO_x$ storage-reduction type which stores (occludes) $NO_x$ within exhaust gas when an air-fuel ratio of the exhaust gas is lean, that is, larger than a stoichiometric air-fuel ratio (i.e., an air excess ratio $\lambda>1$) and reduces the stored $NO_x$ when the air-fuel ratio of the exhaust gas is close to the stoichiometric air-fuel ratio ($\lambda\approx1$) or rich, that is, smaller than the stoichiometric air-fuel ratio ($\lambda<1$), and a PM filter which captures particulate matter are provided in an exhaust passage of the engine. Moreover, a control for maintaining a high purifying performance of these devices is executed.

For example, JP2016-109041A discloses an engine having an oxidation catalyst which oxidizes HC and CO, a $NO_x$ catalyst of a $NO_x$ storage-reduction type, and a PM filter which captures particulate matter. JP2016-109041A also discloses a configuration in which a control for injecting fuel into a cylinder from a late stage of expansion stroke to exhaust stroke to supply unburned fuel as a reducing agent to the $NO_x$ catalyst in order to reduce $NO_x$ stored in the $NO_x$ catalyst is executed. A configuration is also disclosed in which the fuel is injected into the cylinder from the late stage of the expansion stroke to the exhaust stroke to cause an oxidation reaction of the unburned fuel by the oxidation catalyst so as to raise temperature of the exhaust gas. Thus, combustion of the particulate matter captured by the PM filter is stimulated in order to maintain a high purifying performance of the PM filter.

In engines provided, for example, in a vehicle, improvements in exhaust performance and fuel efficiency are desired. However, in order to reduce the $NO_x$ stored in the $NO_x$ catalyst and combust to remove the particulate matter captured by the PM filter as described above, the fuel which does not contribute to an engine torque needs to be supplied to the cylinder, etc., and a difficulty in sufficiently improving the fuel efficiency arises as an issue.

SUMMARY OF THE DISCLOSURE

The present disclosure is made in view of the above issues and aims to provide a control system for an engine, which improves purifying performances of a $NO_x$ catalyst and a PM filter while also improving fuel efficiency.

According to one aspect of the present disclosure, a control system for an engine is provided, which includes an engine body formed with a cylinder, a $NO_x$ catalyst provided in an exhaust passage through which exhaust gas discharged from the engine body flows, and configured to store $NO_x$ within the exhaust gas when an air-fuel ratio of the exhaust gas is lean, and reduce and release the stored $NO_x$ when the air-fuel ratio of the exhaust gas is close to a stoichiometric air-fuel ratio or rich, an oxidation catalyst provided integrally with the $NO_x$ catalyst or in the exhaust passage upstream of the $NO_x$ catalyst and configured to oxidize unburned fuel within the exhaust gas, a particulate matter (PM) filter provided in the exhaust passage downstream of the oxidation catalyst and configured to capture particulate matter within the exhaust gas, a fuel injector configured to perform a main injection in which fuel is injected into the cylinder to obtain an engine torque and a post injection in which fuel is injected into the cylinder at a timing later than the main injection, and a controller including a processor configured to execute a $DeNO_x$ control in which the fuel injector is controlled to perform the main injection and the post injection so that the air-fuel ratio of the exhaust gas is brought close to the stoichiometric air-fuel ratio or becomes rich and the fuel supplied into the cylinder by the post injection combusts therein, and a filter regenerating control in which the fuel injector is controlled to perform the main injection and the post injection so that the air-fuel ratio of the exhaust gas becomes lean and the fuel supplied into the cylinder by the post injection causes no combustion therein, the controller executing the $DeNO_x$ control and the filter regenerating control consecutively in this order.

According to this device, $NO_x$ which is stored in the $NO_x$ catalyst is reduced by executing the $DeNO_x$ control and purifying performance of the $NO_x$ catalyst is restored. Additionally, since the fuel injected in the post injection (hereinafter, may be simply referred to as "the post-injected fuel") is combusted inside the cylinder in the $DeNO_x$ control, compared to a case where the post injection is performed at a retarded timing at which the post-injected fuel does not combust inside the cylinder, an amount of post-injected fuel mixed into engine oil is reduced, and various devices provided in the exhaust passage are prevented from being blocked by a deposit caused by the unburned fuel.

Further, by executing the filter regenerating control, the temperature of the exhaust gas, further the temperature of the PM filter provided downstream of the oxidation catalyst, are increased by oxidizing the unburned fuel by the oxidation catalyst, and oxygen is introduced into the PM filter. Thus, particular matter captured by the PM filter is suitably combusted and removed, and the purifying performance is restored.

In addition, in this system, the post-injected fuel during the $DeNO_x$ control is combusted inside the cylinder as described above, and after this $DeNO_x$ control, the filter regenerating control is executed successively. Thus, the temperature of the exhaust gas is increased before the filter regenerating control to activate the oxidation catalyst and the temperature of the PM filter is increased, which further promotes, in the filter regenerating control, the combustion of the particulate matter in the PM filter. Therefore, an amount of the unburned fuel which needs to be supplied to the oxidation catalyst to achieve this temperature increase is made small and fuel efficiency is improved. Further, since $NO_x$ stored in the $NO_x$ catalyst is reduced before executing the filter regenerating control, even when the temperature of the $NO_x$ catalyst is increased by executing the filter regenerating control, it is prevented that a large amount of $NO_x$ is released from the $NO_x$ catalyst and exhaust performance degrades due to this temperature increase.

After an amount of particulate matter accumulated in the PM filter falls below a given reference amount in the filter regenerating control, the controller may execute a $DeSO_x$ control for alternately performing an enriching process in which the fuel injector is controlled to perform the main injection and the post injection so that the air-fuel ratio of the exhaust gas is brought close to the stoichiometric air-fuel ratio or becomes rich and the fuel supplied into the cylinder by the post injection combusts therein, and a lean process in which the fuel injector is controlled to perform the main injection and the post injection so that the air-fuel ratio of the exhaust gas becomes lean and the fuel supplied into the cylinder by the post injection causes no combustion therein.

According to this configuration, $SO_x$ which is stored in the $NO_x$ catalyst is reduced by executing the $DeSO_x$ control and the purifying performance of the $NO_x$ catalyst is restored more reliably.

Here, it is known that if a control of alternately changing the air-fuel ratio of the exhaust gas between lean and rich is executed in the state where the large amount of particular matter exists in the PM filter, the combustion of this large amount of particular matter in the PM filter rapidly progresses, which may excessively increase the temperature of the PM filter.

In this regard, in this configuration, the $DeSO_x$ control of alternately changing the air-fuel ratio of the exhaust gas between lean and rich is started after the amount of particulate matter accumulated in the PM filter falls below a given reference amount in the filter regenerating control. Thus, the $DeSO_x$ control is executed while avoiding the excessive increase in temperature of the PM filter.

The reference amount may be set larger than zero.

According to this configuration, by using the lean process in the $DeSO_x$ control, the particulate matter accumulated in the PM filter is combusted and removed. Therefore, the execution time for the filter regenerating control is shortened compared to execution at a different timing from the $DeSO_x$ control.

The control system may further include an exhaust gas recirculation (EGR) passage communicating an intake passage configured to introduce intake air into the engine body, with the exhaust passage, and an EGR valve configured to open and close the EGR passage. During the enriching process of the $DeSO_x$ control, the controller may control an opening of the EGR valve to be narrower than in a case where the enriching process is not performed, and during the filter regenerating control, the controller may control the opening of the EGR valve to be further narrower than during the $DeSO_x$ control.

According to this configuration, during the filter regenerating control, various devices provided in the exhaust passage are prevented from being blocked by the deposit caused by an excessive amount of the unburned fuel, which is discharged to the exhaust passage, flowing into the EGR passage. Further, during the enriching process of the $DeSO_x$ control, the combustion stability is improved by introducing the high-temperature EGR gas into the cylinder while preventing a large amount of soot from being generated when the post-injected fuel combusts due to an excessive amount of EGR gas (exhaust gas flowing inside the EGR passage) being introduced.

The control system may further include an EGR passage communicating an intake passage configured to introduce intake air into the engine body, with the exhaust passage, and an EGR valve configured to open and close the EGR passage. During the $DeNO_x$ control, the controller may control an opening of the EGR valve to be narrower than in a case where the $DeNO_x$ control is not executed, and during the filter regenerating control, the controller may control the opening of the EGR valve to be further narrower than during the $DeNO_x$ control.

According to this configuration, during the filter regenerating control, the various devices provided in the exhaust passage are prevented from being blocked by the deposit caused by the excessive amount of the unburned fuel, which is discharged to the exhaust passage, flowing into the EGR passage. Further, during the $DeNO_x$ control, the combustion stability is improved by introducing the high-temperature EGR gas into the cylinder while preventing that the large amount of soot is generated when the post-injected fuel combusts due to the excessive amount of the EGR gas being introduced.

According to one aspect of the present disclosure, a control system for an engine is provided, which includes an engine body formed with a cylinder, a $NO_x$ storage catalyst provided in an exhaust passage through which exhaust gas discharged from the engine body flows, an oxidation catalyst provided integrally with the $NO_x$ catalyst or in the exhaust passage upstream of the $NO_x$ catalyst, a filter provided in the exhaust passage downstream of the oxidation catalyst and configured to capture particulate matter, a fuel injection valve configured to supply fuel into the cylinder, and a controller connected to the fuel injection valve, including a processor, and configured to output a control signal to the fuel injection valve. When a filter regeneration executing condition is determined as satisfied, the controller outputs the control signal to the fuel injection valve to execute a first fuel injection control in which an air-fuel ratio of the exhaust gas is brought close to the stoichiometric air-fuel ratio or rich by a main injection set according to an accelerator opening and a post injection in which the fuel is injected at a crank angle timing in an early half of expansion stroke, and when an amount of $NO_x$ stored in the $NO_x$ storage catalyst is determined to be smaller than a given value during the first fuel injection control, the controller outputs a control signal to the fuel injection valve to stop the first fuel injection control and perform a second fuel injection control in which the air-fuel ratio of the exhaust gas is brought to be lean by a main injection set according to the accelerator opening and a post injection in which the fuel is injected at a crank angle timing in a latter half of the expansion stroke.

The controller may calculate a PM accumulation amount based on output signals of pressure sensors provided on upstream and downstream sides of the filter, respectively, and when the PM accumulation amount exceeds a given value, the controller may determine that the filter regeneration executing condition is satisfied.

The controller may estimate a $NO_x$ reduction amount per unit time based on a post injection amount during the first fuel injection control, and an output value of a temperature sensor provided in the exhaust passage upstream of the $NO_x$ storage catalyst, and estimate a current $NO_x$ stored amount by subtracting the $NO_x$ reduction amount per unit time from a $NO_x$ stored amount obtained in a previously performed calculation.

DETAILED DESCRIPTION OF THE DISCLOSURE

Hereinafter, a control system for an engine according to one embodiment of the present disclosure is described with reference to the accompanying drawings.

(1) Overall Configuration

Figure 1:
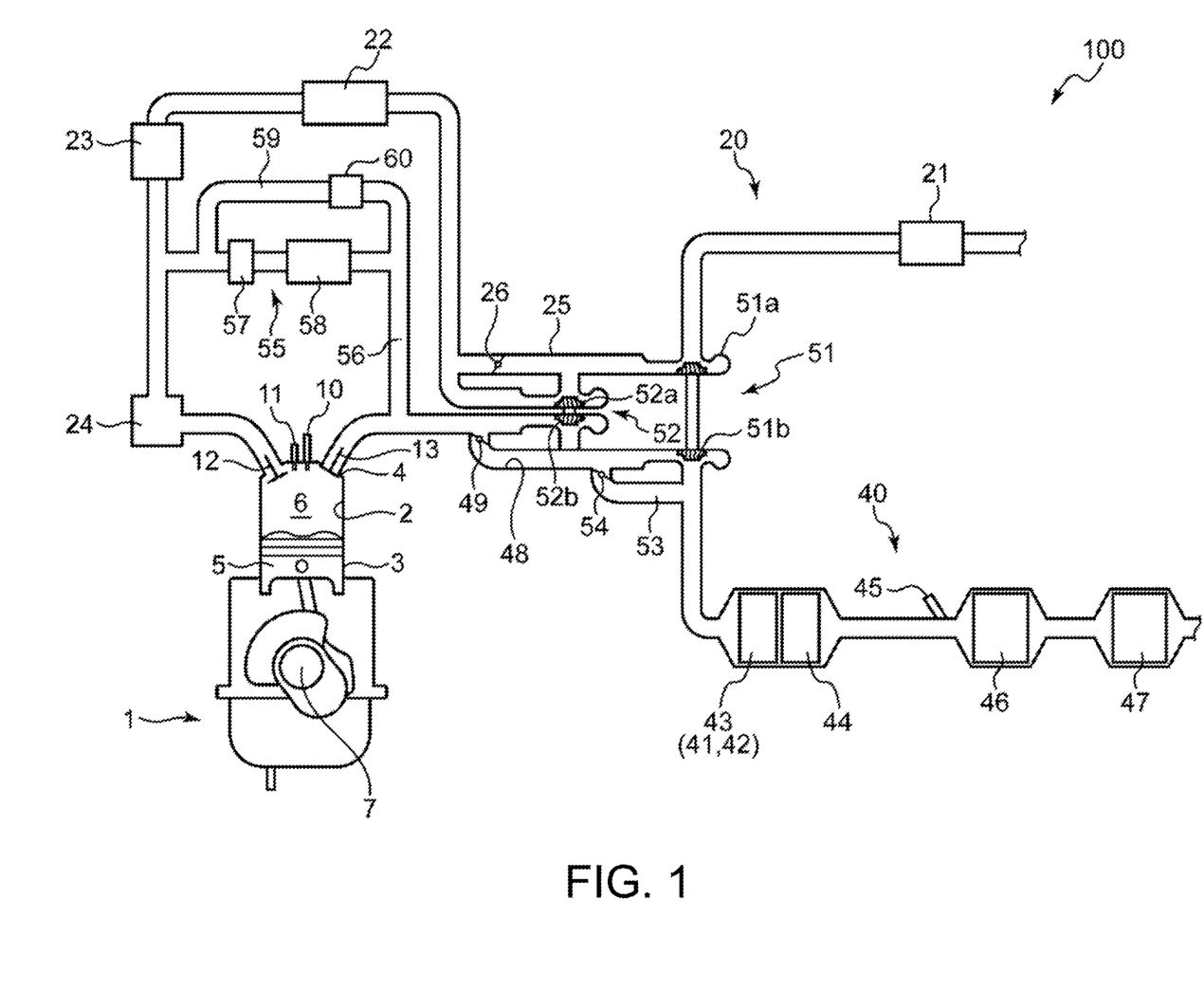
FIG. 1 is a schematic configuration view of an engine system to which a control system for an engine according to one embodiment of the present disclosure is applied.

FIG. 1 is a schematic configuration view of an engine system 100 to which a control system for an engine according to one embodiment of the present disclosure is applied.

The engine system 100 includes a four-stroke engine body 1, an intake passage 20 which introduces air (intake air) into the engine body 1, an exhaust passage 40 through which exhaust gas is discharged from the engine body 1 to an outside thereof, a first turbocharger 51, and a second turbocharger 52. The engine system 100 is provided in a vehicle, and the engine body 1 is used as a drive source of the vehicle. The engine body 1 is, for example, a diesel engine and has four cylinders 2 arranged in a direction orthogonal to the sheet of FIG. 1.

The engine body 1 has a cylinder block 3 formed therein with the cylinders 2, a cylinder head 4 provided on an upper surface of the cylinder block 3, and pistons 5 respectively reciprocatably fitted into each cylinder 2. A combustion chamber 6 is formed on each piston 5.

The piston 5 is connected to a crankshaft 7, and the crankshaft 7 rotates about its center axis according to the reciprocation of the piston 5.

The cylinder head 4 is provided with a pair of a fuel injection valve (fuel injector) 10 and a glowplug 11 for each cylinder 2. The fuel injection valve 10 injects fuel into the combustion chamber 6 (into the cylinder 2), and the glowplug 11 raises a temperature of a mixture gas containing the fuel and air inside the combustion chamber 6.

In the example of FIG. 1, the fuel injection valve 10 is provided at a center of a ceiling surface of the combustion chamber 6 so as to be oriented downwardly toward the combustion chamber 6. Further, the glowplug 11 has at its tip end a heat generating part which generates heat by being energized, and this heat generating part is attached to the ceiling surface of the combustion chamber 6 so as to be located near a tip part of the fuel injection valve 10. For example, the fuel injection valve 10 has a plurality of nozzle ports at its tip end, and the glowplug 11 is disposed so that, when the fuel is injected from the nozzle ports in the form of fuel spray, the heat generating part is located between the fuel sprays from the adjacent nozzle ports of the fuel injection valve 10 and does not directly contact with the fuel sprays.

The fuel injection valve 10 performs a main injection which is mainly carried out to obtain an engine torque and in which the fuel is injected into the combustion chamber 6 so as to combust near a top dead center of compression stroke (CTDC), and a post injection in which the fuel is injected into the combustion chamber 6 at a timing later than the main injection and at which, even when the injected fuel is combusted, a combustion energy thereof scarcely contributes to the engine torque.

The cylinder head 4 is formed with an intake port which introduces the air supplied from the intake passage 20 into the combustion chamber 6 of each cylinder 2, an intake valve 12 which opens and closes the intake port, an exhaust port which leads the exhaust gas generated inside the combustion chamber 6 of each cylinder 2 out to the exhaust passage 40, and an exhaust valve 13 which opens and closes the exhaust valve.

In the intake passage 20, an air cleaner 21, a compressor 51a (hereinafter, suitably referred to as "the first compressor 51a") of the first turbocharger 51, a compressor 52a (hereinafter, suitably referred to as "the second compressor 52a") of the second turbocharger 52, an intercooler 22, a throttle valve 23, and a surge tank 24 are provided in order from an upstream side. An intake bypass passage 25 which bypasses the second compressor 52a and an intake bypass valve 26 which opens and closes the intake bypass passage 25 are also provided in the intake passage 20. The intake bypass valve 26 is switched between a fully closed state and a fully opened state by a drive device (not illustrated).

In the exhaust passage 40, in order from the upstream side, a turbine 52b (hereinafter, suitably referred to as "the second turbine 52b") of the second turbocharger 52, a turbine 51b (hereinafter, suitably referred to as "the first turbine 51b") of the first turbocharger 51, a first catalyst 43, a diesel particulate filter (DPF) 44, a urea injector 45 which injects urea into the exhaust passage 40 downstream of the DPF 44, and a selective catalytic reduction (SCR) catalyst 46 which purifies $NO_x$ by using urea injected from the urea injector 45, and a slip catalyst 47 which purifies non-reacted ammonia discharged from the SCR catalyst 46 by oxidizing it.

The SCR catalyst 46 hydrolyzes the urea injected from the urea injector 45 to generate ammonia, and purifies this ammonia by causing a reaction (reducing it) with $NO_x$ within the exhaust gas.

The DPF 44 captures particulate matter (PM) within the exhaust gas. The PM captured by the DPF 44 combusts by being exposed to a high temperature atmosphere and receiving a supply of oxygen, and thus, is removed from the DPF 44. The temperature at which PM is removed by combustion is as comparatively high as about 600° C. Therefore, in order to combust the PM and remove it from the DPF 44, the temperature of the DPF 44 needs to be raised comparatively high.

The first catalyst 43 includes a $NO_x$ catalyst 41 which purifies $NO_x$, and a diesel oxidation catalyst (DOC) 42.

The oxidation catalyst 42 oxidizes hydrocarbon (HC), that is, unburned fuel, and carbon monoxide (CO) by using oxygen within the exhaust gas, to convert them into water and carbon dioxide. Here, this oxidation reaction occurring in the oxidation catalyst 42 is an exothermic reaction, and when the oxidation reaction occurs in the oxidation catalyst 42, the temperature of the exhaust gas rises.

The $NO_x$ catalyst 41 is a $NO_x$ storage catalyst (NSC) which stores (occludes) $NO_x$ within the exhaust gas when an air-fuel ratio of the exhaust gas is lean (that is, larger than a stoichiometric air-fuel ratio, i.e., an air excess ratio $\lambda > 1$), and reduces the stored $NO_x$ when the air-fuel ratio of the exhaust gas is close to the stoichiometric air-fuel ratio ($\lambda \approx 1$) or rich (that is, smaller than the stoichiometric air-fuel ratio ($\lambda < 1$)), i.e., in a reduction atmosphere in which the exhaust gas passing through the $NO_x$ catalyst 41 includes a large amount of unburned HC. The first catalyst 43 is formed by, for example, coating a catalyst material of the NSC on a surface of a catalyst material layer of the DOC.

Note that in this embodiment, no device for supplying air or fuel to the exhaust passage is separately provided, and the air-fuel ratio of the exhaust gas corresponds to the air-fuel ratio of the mixture gas inside the combustion chamber 6. In other words, when the air-fuel ratio of the mixture gas inside the combustion chamber 6 is lean, the air-fuel ratio of the exhaust gas also becomes lean, and when the air-fuel ratio of the mixture gas inside the combustion chamber 6 is close to the stoichiometric air-fuel ratio ($\lambda \approx 1$) or rich ($\lambda < 1$), the air-fuel ratio of the exhaust gas is also close to the stoichiometric air-fuel ratio or rich. Therefore, hereinafter, only the air-fuel ratio of the mixture gas may be referred to even when applying to both the air-fuel ratio of the exhaust gas and the air-fuel ratio of the mixture gas.

Here, the $NO_x$ catalyst 41 stores (adsorbs) $SO_x$ in addition to $NO_x$. For example, the $NO_x$ catalyst 41 stores $SO_x$ within the exhaust gas when the air-fuel ratio of the exhaust gas is lean ($\lambda>1$). $SO_x$ stored in the $NO_x$ catalyst 41 is reduced when the air-fuel ratio of the exhaust gas is close to the stoichiometric air-fuel ratio ($\lambda\approx1$) or rich ($\lambda<1$).

Although the SCR catalyst 46 and the $NO_x$ catalyst 41 are both capable of purifying $NO_x$, temperatures at which their purification ratios ($NO_x$ storage ratios) increase are different. The $NO_x$ purification ratio ($NO_x$ storage ratio) of the SCR catalyst 46 increases when the temperature of the exhaust gas is comparatively high, and the $NO_x$ purification ratio of the $NO_x$ catalyst 41 increases when the temperature of the exhaust gas is comparatively low.

An exhaust bypass passage 48 which bypasses the second turbine 52*b*, an exhaust bypass valve 49 which opens and closes the exhaust bypass passage 48, a wastegate passage 53 which bypasses the first turbine 51*b*, and a wastegate valve 54 which opens and closes the wastegate passage 53 are provided in the exhaust passage 40. Each of the exhaust bypass valve 49 and the wastegate valve 54 is switched between a fully closed state and a fully opened state by a drive device (not illustrated), and controlled to have an arbitrary opening between these states.

The engine system 100 of this embodiment has an exhaust gas recirculation (EGR) device 55 which recirculates a portion of the exhaust gas to the intake air. The EGR device 55 includes an EGR passage 56 connecting a part of the exhaust passage 40 upstream of an upstream end of the exhaust bypass valve 49 to a part of the intake passage 20 between the throttle valve 23 and the surge tank 24, a first EGR valve 57 which opens and closes the EGR passage 56, and an EGR cooler 58 which cools the exhaust gas passing through the EGR passage 56. The EGR device 55 also includes an EGR cooler bypass passage 59 bypassing the EGR cooler 58, and a second EGR valve 60 which opens and closes the EGR cooler bypass passage 59.

(2) Control System

Figure 2:
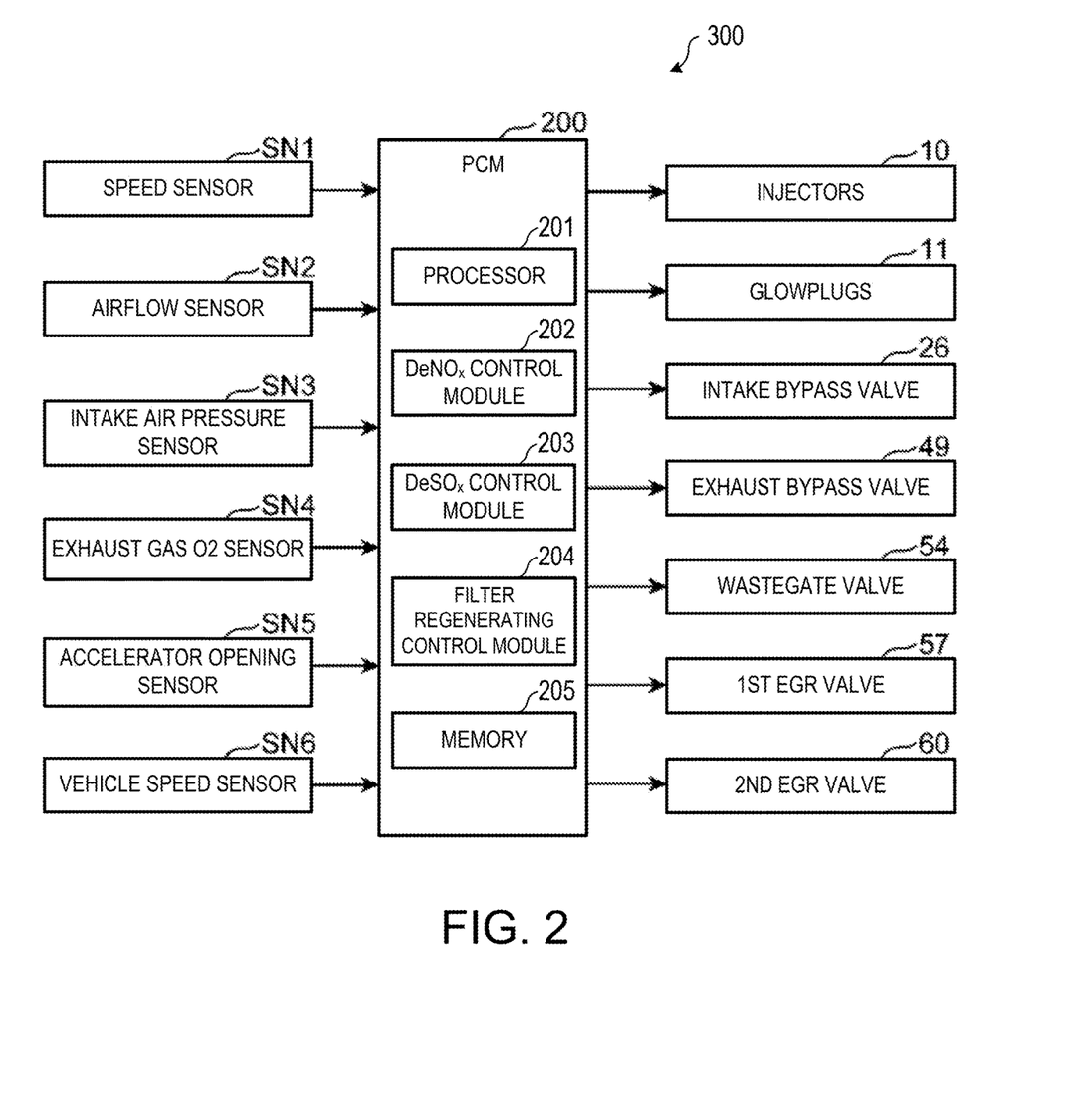
FIG. 2 is a block diagram illustrating a control system of the engine system.

A control system of the engine system is described using FIG. 2. The engine system 100 of this embodiment is mainly controlled by a control system 300 including a PCM (powertrain control module; controller) 200 mounted on the vehicle. The PCM 200 is a microprocessor comprised of a processor 201 (i.e. central processing unit (CPU)), memory 205 (e.g. ROM(s), RAM(s)), an interface (I/F), a $DeNO_x$ control module 202, a $DeSO_x$ control module 203, and a filter regenerating control module 204. The processor is configured to execute the $DeNO_x$ control module 202, the $DeSO_x$ control module 203, and the filter regenerating control module 204 to perform their respective functions. These modules are stored in the memory 205 as one or more software programs.

The PCM 200 receives information from various sensors. For example, the PCM 200 is electrically connected to, for example, a speed sensor SN1 which detects a rotational speed of the crankshaft 7, i.e., an engine speed, an airflow sensor SN2 provided near the air cleaner 21 and which detects an intake air amount which is an amount of fresh air (air) flowing through the intake passage 20, an intake air pressure sensor SN3 provided in the surge tank 24 and which detects pressure of the intake air inside the surge tank 24 after turbocharged by the turbochargers 51 and 52, i.e., turbocharging pressure, and an exhaust gas $O_2$ sensor SN4 which detects an oxygen concentration in a part of the exhaust passage 40 between the first turbocharger 51 and the first catalyst 43. Input signals from the sensors SN1 to SN4 are inputted to the PCM 200. Further, the vehicle is provided with an accelerator opening sensor SN5 which detects an accelerator opening being an opening of an accelerator pedal (not illustrated) which is operated by a vehicle driver, a vehicle speed sensor SN6 which detects a vehicle speed, etc., and detection signals from the sensors SN5 and SN6 are also inputted to the PCM 200. The PCM 200 executes various calculations, etc. based on the input signals from the various sensors (SN1 to SN6, etc.) to control the fuel injection valve 10, etc. The control system also includes components of the engine system 100 shown in FIG. 1, such as the engine body 1, $NO_x$ catalyst 41, oxidation catalyst 42, and PM filter 44 whose operations are affected by the controls executed by the PCM 200.

(2-1) Normal Control

In a normal control executed during a normal operation in which a $DeNO_x$ control, a $DeSO_x$ control and a DPF regenerating control (filter regenerating control) described later are not executed, in order to improve the fuel efficiency, the air-fuel ratio of the mixture gas inside the combustion chamber 6 (hereinafter, may simply be referred to as "the air-fuel ratio of the mixture gas") is set lean ($\lambda>1$, e.g., $\lambda$=about 1.7). Moreover in the normal control, the post injection is stopped and only the main injection is performed. Further, the operation of the glowplug 11 is stopped in the normal control. Additionally in the normal control, the first EGR valve 57, the second EGR valve 60, the intake bypass valve 26, the exhaust bypass valve 49, and the wastegate valve 54 are controlled so that an EGR ratio and the turbocharging pressure become appropriate values according to an operating state of the engine body 1, for example, an engine speed, an engine load, etc.

(2-2) $DeNO_x$ Control

The $DeNO_x$ control for releasing (removing) $NO_x$ stored in the $NO_x$ catalyst 41 (hereinafter, suitably referred to as "the stored $NO_x$") from the $NO_x$ catalyst 41 is described.

As described above, the $NO_x$ catalyst 41 reduces the stored $NO_x$ when the air-fuel ratio of the exhaust gas is close to the stoichiometric air-fuel ratio ($\lambda\approx1$) or rich ($\lambda<1$). In other words, in order to reduce the stored $NO_x$, the air-fuel ratio of the exhaust gas and the air-fuel ratio of the mixture gas need to be reduced lower than during the normal operation (when the normal control is executed).

Therefore, in this embodiment, the post injection is performed to reduce the air-fuel ratio of the mixture gas and reduce the stored $NO_x$. That is, the PCM 200 executes, as the $DeNO_x$ control, a control for causing the fuel injection valve 10 to perform the post injection in addition to the main injection. For example, in the $DeNO_x$ control, the air excess ratio $\lambda$ of the mixture gas is set to about 0.94 to 1.06.

Figure 3:
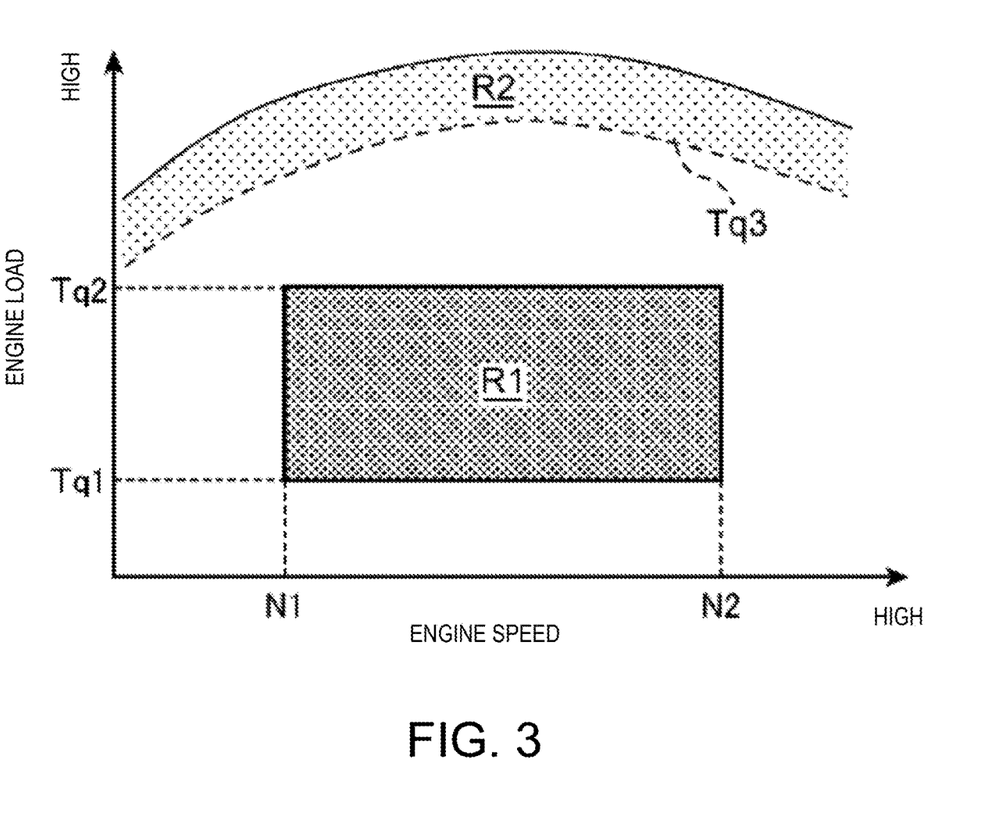
FIG. 3 is a chart illustrating a control map of a passive $DeNO_x$ control and an active $DeNO_x$ control.

In this embodiment, the $DeNO_x$ control in which the post injection is performed to reduce the stored $NO_x$ is executed only within a first range R1 and a second range R2 illustrated in FIG. 3. Within the first range R1, the engine speed is between a given first reference speed N1 and a given second reference speed N2, and the engine load is between a given first reference load Tq1 and a given second reference load Tq2. Within the second second range R2, the engine load is higher than within the first range R1 and above a given third reference load Tq3.

Further, within the first range R1, the PCM 200 executes an active $DeNO_x$ control in which the post injection is performed at a timing at which the fuel injected in the post injection (hereinafter, referred to as "post-injected fuel") combusts inside the combustion chamber 6. The injection timing of the post injection is set in advance, for example, to a timing between 30 and 70° CA after the CTDC in an early half of expansion stroke. In this embodiment, in the active DeNO$_x$ control, the glowplug 11 is energized to heat the mixture gas in order to stimulate the combustion of the post-injected fuel.

Further, in the active DeNO$_x$ control, the EGR gas is introduced into the combustion chamber 6 and the openings of the first EGR valve 57 and the second EGR valve 60 are set smaller (narrower) than during the normal operation, that is, smaller than the openings in a case where the active DeNO$_x$ control is not executed. In this embodiment, in the active DeNO$_x$ control, the first EGR valve 57 is fully closed and the second EGR valve 60 is opened at an opening smaller than that during the normal operation.

This is for stimulating the combustion of the post-injected fuel while reducing an amount of soot generated by this combustion. For example, when the post-injected fuel combusts, in addition to the EGR gas, combusted gas resulted from the main injection exists within the combustion chamber 6. Therefore, when a large amount of EGR gas is introduced, the mixing of the post-injected fuel and air becomes insufficient and a large amount of soot may be generated. Additionally, since the post injection is performed at a timing when the temperature and pressure inside the combustion chamber 6 are comparatively low, combustion stability easily degrades. For this reason, in the active DeNO$_x$ control, the first EGR valve 57 is closed to stop the introduction of low-temperature EGR gas passed through the EGR cooler 58 and the second EGR valve 60 is opened to introduce high-temperature EGR gas as described above, so as to stimulate the combustion of the post-injected fuel while improving the combustion stability. Further, the opening of this second EGR valve 60 is set to be smaller than during the normal operation so as to reduce the generation amount of soot.

Specifically, the PCM 200 stores, in maps of the engine speed, the engine load, etc., the opening of the first EGR valve 57 and the opening of the second EGR valve 60 during the active DeNO$_x$ control and also the opening of the first EGR valve 57 and the opening of the second EGR valve 60 during the normal operation. The PCM 200 sets the openings of the first EGR valve 57 and the second EGR valve 60 by extracting values from the map corresponding to the control in execution. Further, the values in the map for the active DeNO$_x$ control are set to be lower than the values in the map for the normal control at the same engine speed, engine load, etc.

On the other hand, within the second range R2, the PCM 200 executes a passive DeNO$_x$ control in which the post injection is performed at a timing at which the post-injected fuel does not combust inside the combustion chamber 6 (in a latter half of the expansion stroke, e.g., 110° CA after the CTDC). Further in the passive DeNO$_x$ control, the first and second EGR valves 57 and 60 are both fully closed in order to avoid the EGR cooler 58, etc. from being blocked by a deposit caused by the unburned fuel resulted from the post-injection.

As described above, the contents of the control of the DeNO$_x$ control are varied between the first and second ranges R1 and R2 for the following reasons.

Within an operating range where the engine load is low or comparatively high and the engine speed is low, the temperature of the NO$_x$ catalyst 41 easily falls below the temperature at which the stored NO$_x$ is reducible due to the temperature of the exhaust gas being low. Therefore, in this embodiment, the DeNO$_x$ control is stopped within this range.

Moreover, although the post injection is performed in the DeNO$_x$ control as described above, when the post-injected fuel is discharged to the exhaust passage 40 at it is without combusting, the deposit caused by this unburned fuel may block the EGR cooler 58, etc. Therefore, the post-injected fuel is preferably combusted inside the combustion chamber 6. However, within an operating range where the engine load is high or comparatively low and the engine speed is high, due to the temperature inside the combustion chamber 6 being high or a time length corresponding to one degree of crank angle being short, it is difficult to sufficiently mix the post-injected fuel with air before the gas inside the combustion chamber 6 is discharged, and the post-injected fuel may not sufficiently be combusted. Further, the insufficient mixing may cause an increase in soot. Therefore, the DeNO$_x$ control is basically stopped within this range.

Note that within the second range R2 where the engine load is extremely high, even during the normal operation, the air-fuel ratio of the mixture gas is set small due to the injection amount for the main injection (hereinafter, suitably referred to as "the main injection amount") being large. Thus, within the second range R2, by reducing the injection amount for the post injection (hereinafter, suitably referred to as "the post injection amount") required for reducing the stored NO$_x$, the influence described above, which is caused by discharging the unburned fuel to the exhaust passage 40, is reduced to be lower.

Therefore, in this embodiment, within the first range R1 where both the engine load and engine speed are not excessively low or excessively high, the active DeNO$_x$ control in which the post-injected fuel combusts inside the combustion chamber 6 is executed, and within the second range R2, the passive DeNO$_x$ control in which the post-injected fuel is not combusted inside the combustion chamber 6 is executed. Note that within the second range R2, the temperature of the exhaust gas is sufficiently high and the DOC catalyst 42 is sufficiently activated. Therefore, the unburned fuel discharged to the exhaust passage 40 is purified by the DOC catalyst 42. By allowing the DeNO$_x$ control only within the operating range where the engine speed and engine load are at medium levels, the combustion stability of the post injection during the DeNO$_x$ control is secured and a degradation of exhaust performance is prevented.

In this embodiment, as described later, in a case where the DPF regenerating control is started in a state where the engine body 1 is operated in the first range R1, the active DeNO$_x$ control is executed before the DPF regenerating control. However, alternatively, when the NO$_x$ stored amount which is the NO$_x$ amount stored in the NO$_x$ catalyst 41 is extremely large, the active DeNO$_x$ control may be executed regardless of the DPF regenerating control being executed. Even in this case, the active DeNO$_x$ control is executed when the engine body 1 is operated within the first range R1. Moreover, if the temperature of the SCR catalyst 46 is increased to the temperature at which the SCR catalyst 46 is able to reduce NO$_x$, the active DeNO$_x$ control is not executed. Additionally, if the temperature of the NO$_x$ catalyst 41 is not increased to the temperature at which the SCR catalyst 46 is able to purify the stored NO$_x$, the active DeNO$_x$ control is not executed.

On the other hand, the execution of the passive DeNO$_x$ control is allowed when the engine body 1 is operated within the second range R2, the temperature of the SCR catalyst 46 is below a given temperature, the temperature of the NO$_x$ catalyst 41 is above a given temperature, and the NO$_x$ stored amount is above a given amount.

The active DeNO$_x$ control may simply be referred to as the DeNO$_x$ control.

(2-3) DPF Regenerating Control

An outline of the DPF (filter) regenerating control for regenerating the purifying ability of the DPF 44 by removing PM captured by the DPF 44 is described.

The DPF regenerating control is started when the oxidation catalyst 42 reaches a given temperature and the oxidation reaction becomes possible and the amount of PM captured by the DPF 44 (hereinafter, simply referred to as the PM accumulation amount) exceeds a given regeneration starting amount, and it is ended when the PM accumulation amount falls below a regeneration ending amount which is set to a value lower than the regeneration starting amount. The PM accumulation amount is calculated, for example, based on a difference in pressure between the upstream side and the downstream side of the DPF 44 which is calculated by pressure sensors provided on the upstream side and the downstream side of the DPF 44. Moreover, the regeneration starting amount is set to a value lower by a given amount than a largest amount of the PM accumulation amount capturable by the DPF 44.

As described above, the PM captured by DPF 44 can be combusted and removed under a high temperature. In this regard, by causing an oxidation reaction by supplying the unburned fuel to the oxidation catalyst 42 provided on the upstream side of the DPF 44, the temperature of the exhaust gas flowing into the DPF 44, further the temperature of the DPF 44, are increased.

Thus, in this embodiment, as the DPF regenerating control, the control in which the post injection is performed while causing the air-fuel ratio of the mixture gas to be lean so that the air and unburned fuel are led into the oxidation catalyst 42 and oxidized thereby, is executed. For example, in the DPF regenerating control, the post injection is performed at the timing at which the post-injected fuel does not combust inside the combustion chamber 6 (in the latter half of the expansion stroke, e.g., 110° CA after the CTDC).

Moreover, in the DPF regenerating control, the first and second EGR valves 57 and 60 are fully closed so as to avoid that the unburned fuel flows into the EGR passage 56 and the EGR cooler 58 and block them. Additionally, since post-injected fuel is not required to combust in the DPF regenerating control, the energization of the glowplug 11 is stopped.

(2-4) $DeSO_x$ Control

The $DeSO_x$ control for reducing and removing $SO_x$ stored in the $NO_x$ catalyst 41 (hereinafter, suitably referred to as "the stored $SO_x$") is described next.

As described above, the stored $SO_x$ is reduced when the air-fuel ratio of the exhaust gas is close to the stoichiometric air-fuel ratio ($\lambda \approx 1$) or rich ($\lambda < 1$). Accordingly, also in the $DeSO_x$ control, the post injection is performed in addition to the main injection so as to cause the air-fuel ratio of the mixture gas to be close to the stoichiometric air-fuel ratio ($\lambda \approx 1$) or rich ($\lambda < 1$).

Note that since $SO_x$ has a higher bonding force than $NO_x$, to reduce the stored $SO_x$, the temperature of the $NO_x$ catalyst 41, further the temperature of the exhaust gas passing therethrough, need to be increased higher than in that the $DeNO_x$ control (to about 600° C.). In this regard, by causing the oxidation reaction of the unburned fuel in the oxidation catalyst 42 as described above, the temperature of the exhaust gas passing through the first catalyst 43, further the $NO_x$ catalyst 41, is increased.

Thus, in this embodiment, the $DeSO_x$ control includes alternately performing an enriching process for performing the post injection similarly to the $DeNO_x$ control to cause the air-fuel ratio of the exhaust gas to be richer than during the normal operation so as to bring it close to or smaller than the stoichiometric air-fuel ratio, and a lean process for performing, while causing the air-fuel ratio of the exhaust gas to be lean, the post injection so as to supply the air and the unburned fuel to the oxidation catalyst 42 to oxidize them therein.

In the enriching process, similar to the active $DeNO_x$ control, the post injection is performed at the timing when the post-injected fuel combusts inside the combustion chamber 6 (in the early half of the expansion stroke, e.g., 30 to 70° CA after the CTDC). Further in the enriching process, the air excess ratios $\lambda$ of the mixture gas and the exhaust gas are set to about 1.0 so as to bring them close to the stoichiometric air-fuel ratio. For example, in the enriching process, the air excess ratios $\lambda$ of the mixture gas and the exhaust gas are set to about 0.94 to 1.06.

Moreover, in the enriching process, similar to the active $DeNO_x$ control, in order to improve the stability of the combustion of the post-injected fuel while reducing the soot caused by this combustion, the first EGR valve 57 is fully closed while the second EGR valve 60 is opened at an opening smaller than that during the normal operation. Moreover, in order to lower the air-fuel ratio of the mixture gas, the PCM 200 controls the throttle valve 23, the exhaust bypass valve 49, and the wastegate valve 54 to reduce the intake air amount smaller than during the normal operation.

On the other hand, in the lean process, the post injection is performed at the timing at which the post-injected fuel does not combust inside the combustion chamber 6 (in the latter half of the expansion stroke, e.g., 110° CA after the CTDC). Further, the air excess ratios $\lambda$ of the mixture gas and the exhaust gas are set to 1 or higher so as to bring the air-fuel ratios of the mixture gas and the exhaust gas to be lean. For example, in the lean process, the air excess ratios $\lambda$ of the mixture gas and the exhaust gas are set to about 1.2 to 1.4.

Moreover in the lean process, the first and second EGR valves 57 and 60 are both fully closed in order to prevent the EGR cooler, etc. from being blocked by a deposit caused by the unburned fuel.

Here, since bringing the air-fuel ratio of the mixture gas inside the combustion chamber 6 to be lean and performing the post injection without causing the fuel to combust as described above result in removing PM by combustion, the PM removal becomes possible during the lean process.

(2-5) Control Flow

Figure 4:
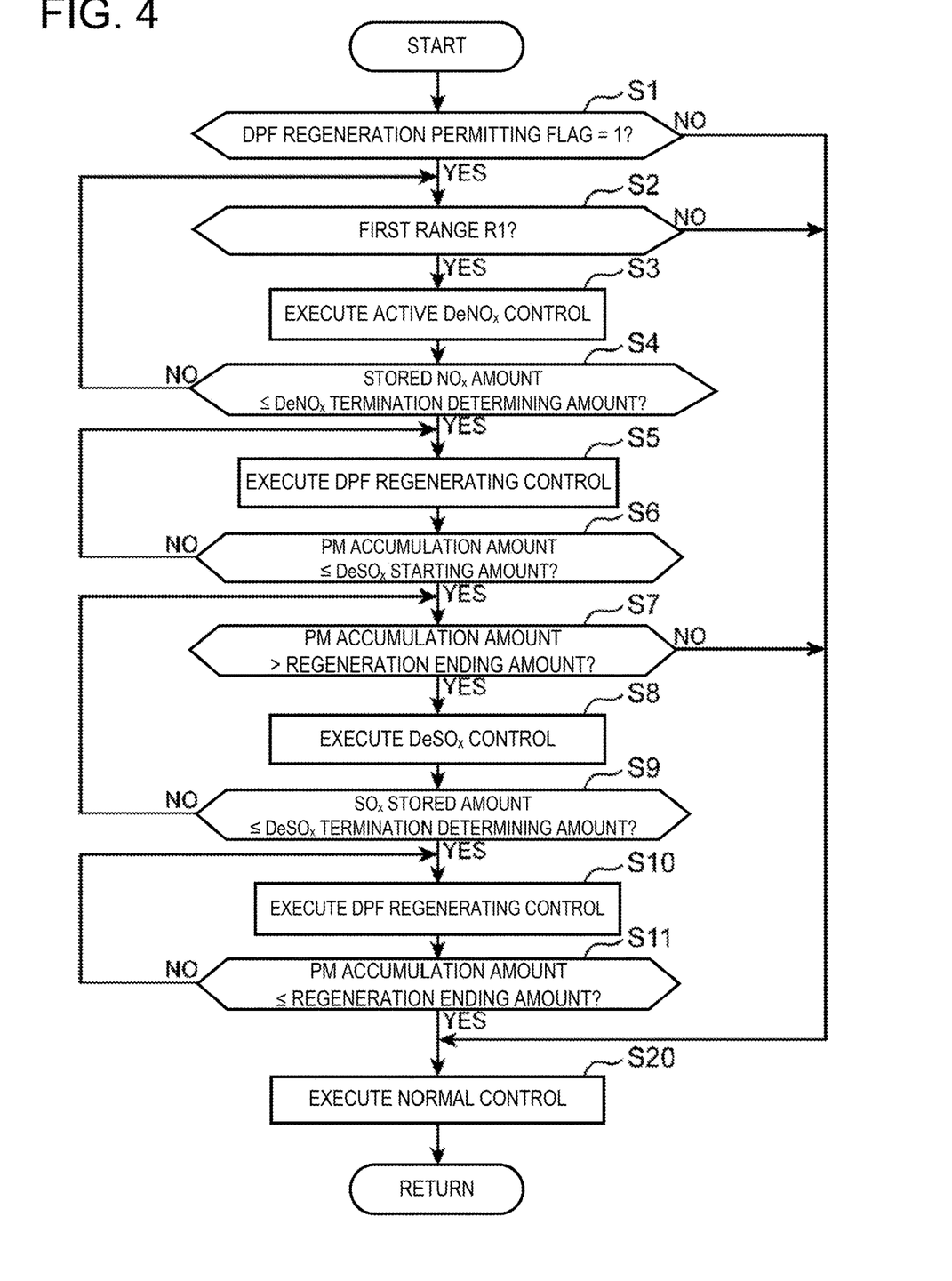
FIG. 4 is a flowchart illustrating a flow of a $DeNO_x$ control, a DPF regenerating control, and a $DeSO_x$ control.

Next, the process of the active $DeNO_x$ control, the DPF regenerating control, and the $DeSO_x$ control are described using the flowchart of FIG. 4.

At S1, the PCM 200 determines whether a DPF regeneration permitting flag is 1. The DPF regeneration permitting flag becomes 1 when the regeneration in the DPF 44 is permitted (a filter regeneration executing condition is satisfied), and becomes 0 when the regeneration of the DPF 44 is prohibited (the filter regeneration executing condition is not satisfied). In this embodiment, the DPF regeneration permitting flag is set to 1 when the PM accumulation amount of the DPF 44 exceeds the regeneration starting amount, and set to 0 when the PM accumulation amount falls below the regeneration ending amount. If the result of this determination is NO, the process proceeds to S20 where the PCM 200 executes the normal control and then terminates the process (returns to S1). On the other hand, if the result of the determination at S1 is YES, the process proceeds to S2.

At S2, the PCM 200 determines whether the engine body 1 is operated within the first range R1. If the result of this determination is NO, the process proceeds to S20 where the PCM 200 executes the normal control and then terminates the process (returns to S1). On the other hand, if the result of the determination at S2 is YES, the process proceeds to S3.

At S3, the PCM 200 executes the active $DeNO_x$ control (first fuel injection control).

Then the process proceeds to S4 where the PCM 200 determines whether the stored $NO_x$ amount is smaller than a given $DeNO_x$ termination determining amount, that is, whether the stored $NO_x$ amount falls below the $DeNO_x$ termination determining amount due to the execution of the active $DeNO_x$ control. If the result of this determination is NO, the process returns to S2. On the other hand, if the result of this determination is YES, the process proceeds to S5. In other words, the PCM 200 continues the active $DeNO_x$ control until the stored $NO_x$ amount falls below the $DeNO_x$ termination determining amount and the determination of S4 results in being YES, or the range is no longer the first range R1 and the determination of S2 results in being NO. The $DeNO_x$ termination determining amount is, for example, set to a value around 0.

Then, when the result of the determination of S4 results in being YES, the PCM 200 proceeds to S5 where the PCM 200 stops the active $DeNO_x$ control and executes (starts) the DPF regenerating control. Next, the process proceeds to S6.

At S6, the PCM 200 determines whether the PM accumulation amount is smaller than a given $DeSO_x$ starting amount (reference amount). If the result of this determination is NO, the PCM 200 returns to S5. In other words, the PCM 200 continues the DPF regenerating control until the PM accumulation amount falls below the $DeSO_x$ starting amount. The $DeSO_x$ starting amount is set to be an amount larger than 0 but smaller than the regeneration starting amount, for example, about 50% of the regeneration starting amount.

Once the PM accumulation amount falls below the $DeSO_x$ starting amount and cause the result of the determination of S6 to be YES, the PCM 200 proceeds to S7 where the PCM 200 further determines whether the PM accumulation amount is larger than a regeneration ending amount. If the result of the determination is NO and the PM accumulation amount is smaller than the regeneration ending amount, the process proceeds to S20.

On the other hand, if the result of the determination of S7 is YES, the PCM 200 proceeds to S8 to execute (start) the $DeSO_x$ control (second fuel injection control). After S8, the process proceeds to S9.

At S9, the PCM 200 determines whether the $SO_x$ stored amount is smaller than a $DeSO_x$ termination determining amount. If the result of this determination is NO, the PCM 200 returns to S7. In other words, in this embodiment, even if the result of the determination of S9 is NO and the $SO_x$ stored amount is above the $DeSO_x$ termination determining amount, once the result of the determination of S7 becomes NO and the PM accumulation amount falls below the regeneration ending amount, the process proceeds to S20 to stop the $DeSO_x$ control and switch the control to the normal control. Note that the determination of S7 may alternatively be omitted so that the $DeSO_x$ control is continued until the $SO_x$ stored amount falls below the $DeSO_x$ termination determining amount regardless of that the PM accumulation amount is smaller than the regeneration ending amount, so that the control is not switched to the normal control until the $SO_x$ stored amount falls below the $DeSO_x$ termination determining amount.

On the other hand, if the result of the determination of S9 is YES, the PCM 200 proceeds to S10.

At S10, the PCM 200 executes the DPF regenerating control. In other words, when the $SO_x$ stored amount falls below the $DeSO_x$ termination determining amount, the $DeSO_x$ control is stopped and the DPF regenerating control is resumed. After S10, the process proceeds to S11.

At S11, the PCM 200 determines whether the PM accumulation amount is smaller than the regeneration ending amount. If the result of this determination is NO, the PCM 200 returns to S10. On the other hand, if the result of this determination is YES, the PCM 200 proceeds to S20. In other words, when the PM accumulation amount falls below the regeneration ending amount, the PCM 200 terminates the DPF regenerating control.

Figure 5:
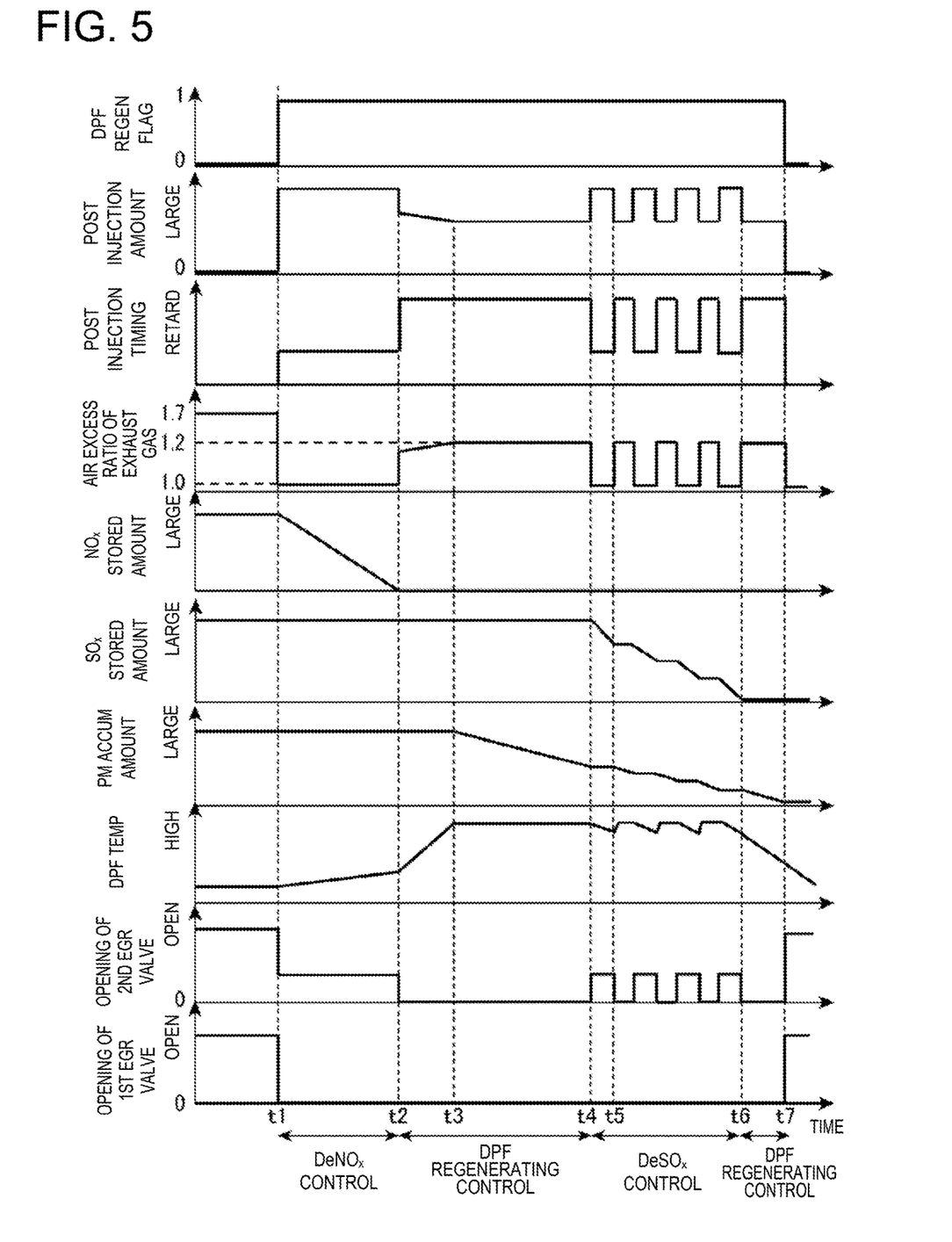
FIG. 5 shows charts schematically illustrating changes in parameters over time when the $DeNO_x$ control, etc. are executed.

FIG. 5 shows charts schematically illustrating changes of parameters over time when the above controls are executed.

When the DPF regeneration permitting flag changes from 0 to 1 at time t1, the active $DeNO_x$ control is executed. For example, the air-fuel ratio of the exhaust gas is set to be rich and the post injection is performed. Here, the injection timing of the post injection is set on the comparatively advance side (the early half of the expansion stroke) so that the post-injected fuel combusts inside the combustion chamber 6. Further, the first EGR valve 57 is fully closed and the opening of the second EGR valve 60 is set smaller (narrower) than during the normal operation, i.e., immediately before time t1, but not fully closed.

Due to the execution of the active $DeNO_x$ control, after time t1, the $NO_x$ stored amount gradually decreases. Further, due to the temperature of the exhaust gas increasing by the combustion of the post-injected fuel inside the combustion chamber 6, after time t1, the temperature of the DPF 44 gradually increases. Moreover, although not illustrated, the temperature of the oxidation catalyst 42 also gradually increases.

When the stored $NO_x$ amount falls below the $DeNO_x$ termination determining amount at time t2, the active $DeNO_x$ control is stopped and then the DPF regenerating control is executed.

For example, at time t2, the air-fuel ratio of the exhaust gas is switched to be lean. Moreover, although the post injection is still performed after time t2, the injection timing of the post injection is set on the retarding side (the latter half of the expansion stroke), and the post-injected fuel is discharged to the exhaust passage 40 without combusting inside the combustion chamber 6. Furthermore, the second EGR valve 60 is fully closed in addition to the first EGR valve 57.

By this control, the temperature of the exhaust gas increases by the oxidation reaction in the oxidation catalyst 42, which further increases the temperature of the DPF 44.

In the example of FIG. 5, the temperature of the DPF 44 has not reached the level at which PM is combustible, and by reaching this level at time t3, the PM accumulation amount starts decreasing. Further in the example of FIG. 5, while approaching the temperature at which PM is combustible, the post injection amount is reduced.

When the PM accumulation amount falls below the $DeSO_x$ starting amount at time t4, the $DeSO_x$ control is started. For example, the enriching process is performed at time t4, the post injection designed so that the injection timing is on the comparatively advance side and the injected fuel combusts inside the combustion 6 is performed, and the air-fuel ratio of the exhaust gas is set to be rich. Moreover, the second EGR valve 60 is opened. Note that also in the enriching process, similar to the active $DeNO_x$ control, the opening of the second EGR valve 60 is set smaller (narrower) than during the normal operation, i.e., immediately before time t1. In this embodiment, the opening of the second EGR valve 60 is made substantially the same between during the enriching process and during the active DeNO$_x$ control. Note that the first EGR valve 57 is kept fully closed.

Next, the lean process is performed at time t5, the post injection designed so that the injection timing is on the comparatively retarding side and the injected fuel does not combust inside the combustion 6 is performed, and the air-fuel ratio of the exhaust gas is set to be lean. Moreover, the second EGR valve 60 is fully closed again. Note that the first EGR valve 57 is still kept fully closed.

Further, the enriching process and the lean process are repeated, and thus, after time t4, the stored SO$_x$ amount decreases. Specifically, the stored SO$_x$ amount decreases due to the enriching process. Further, the PM accumulation amount also decreases by the lean process.

Then, due to the SO$_x$ stored amount falling below the DeSO$_x$ termination determining amount at time t6, the DeSO$_x$ control is stopped and the DPF regenerating control is restarted.

Then, due to the PM accumulation amount falling below the regeneration ending amount at time t7, the DPF regenerating control is terminated and switched to the normal control. For example, the post injection amount is set to 0 to stop the post injection. Further, the first EGR valve 57 is opened and the opening of the second EGR valve 60 is increased (larger) than during the enriching process in the DeNO$_x$ control and the DeSO$_x$ control. Moreover, the DPF regenerating flag is set 0.

(3) Effects, etc.

As described above, in this embodiment, NO$_x$ and SO$_x$ which are stored in the NO$_x$ catalyst are suitably reduced and removed by executing the DeNO$_x$ control and the DeSO$_x$ control. Further, PM captured by the DPF 44 is suitably combusted and removed by executing the DPF regenerating control. Therefore, the purifying performance of the NO$_x$ catalyst 41 and the DPF 44 are improved.

Additionally, during the active DeNO$_x$ control, the post-injected fuel is combusted inside the combustion chamber 6, and after the active DeNO$_x$ control, in continuation thereto, the DPF regenerating control is executed.

Therefore, the temperature of the exhaust gas is increased during the active DeNO$_x$ control, and thus, the oxidation catalyst 42 is activated and the temperature of the DPF 44 is increased, which advances, in the following DPF regenerating control, the start timing of the combustion of PM captured by the DPF 44. Therefore, compared to the case where the active DeNO$_x$ control and the DPF regenerating control are executed at different timings, a period of time from the start of the DPF regenerating control until the temperature of the DPF 44 increases to the level at which PM is combustible is shortened, the unburned fuel amount which needs to be supplied to the oxidation catalyst 42 to achieve this temperature increase is made small and the fuel efficiency is improved.

Further, since NO$_x$ stored in the NO$_x$ catalyst 41 is reduced before executing the DPF regenerating control, even when the temperature of the NO$_x$ catalyst 41 is increased by executing the DPF regenerating control, a release of large amount of NO$_x$ from the NO$_x$ catalyst 41 due to the temperature increase is prevented. Thus, an exhaust performance is improved.

Moreover, in this embodiment, the post-injected fuel is combusted inside the combustion chamber 6 during the active DeNO$_x$ control. Therefore, compared to the case where the post injection is performed at the retarded timing at which the post-injected fuel does not combust inside the combustion chamber 6, an amount of post-injected fuel which leaks from the combustion chamber 6 to the crankcase side and is mixed into engine oil is reduced, and various devices provided in the exhaust passage are prevented from being blocked by the deposit caused by the unburned fuel.

Further in this embodiment, after the DPF regenerating control is started, when the PM accumulation amount of the DPF 44 falls below the DeSO$_x$ starting amount which is set larger than 0, the DeSO$_x$ control including the lean process starts. Therefore, by executing the DeSO$_x$ control, SO$_x$ stored in the NO$_x$ catalyst is reduced and removed while PM of the DPF 44 is also combusted and removed, and the purifying performances of the NO$_x$ catalyst 41 and the DPF 44 are efficiently restored. That is, compared to the case of individually executing the DPF regenerating control and the DeSO$_x$ control, the execution time for the regenerating control of the DPF 44 is shortened, a required amount of fuel for combusting PM of the DPF 44 is reduced, and the fuel efficiency is improved even more.

Moreover, it is avoided that an excessive reaction of PM occurs due to the execution of the DeSO$_x$ control in the state where the PM accumulation amount is large and the temperature of the DPF 44 excessively increases, and further that the DPF 44 is thermally damaged.

For example, the combustion of PM inside the DPF 44 easily progresses when the air-fuel ratio of the exhaust gas is changed between lean and rich in the state where a large amount of PM is inside the DPF 44. Therefore, if the large amount of PM is inside the DPF 44 during the DeSO$_x$ control in which the air-fuel ratio of the exhaust gas is changed between lean and rich, the combustion of this large amount of PM rapidly progresses, which may excessively increase the temperature of the DPF 44. In this regard, in this embodiment, since the DeSO$_x$ control is started after the PM accumulation amount falls below the DeSO$_x$ starting amount, the excessive increase in temperature of the DPF 44 is prevented.

Particularly in this embodiment, since the DeSO$_x$ starting amount is set smaller than the regeneration starting amount, the DeSO$_x$ control is avoided from starting in the state where the PM accumulation amount is large, and the thermal damage of the DPF 44 is prevented.

Moreover, in this embodiment, during the enriching process of the DeSO$_x$ control, the openings of the EGR valves 57 and 60 are controlled to be narrower than during the normal operation (i.e., in a case where the DeSO$_x$ control is not executed), and during the DPF regenerating control, the EGR valve 60 is controlled to be fully closed (i.e., further narrower than during the DeSO$_x$ control).

Therefore, during the DPF regenerating control, the various devices provided in the exhaust passage 40, such as the EGR cooler 58, are prevented from being blocked by the deposit caused by the unburned fuel discharged to the exhaust passage 40. During the enriching process of the DeSO$_x$ control, the amount of soot generated by the combustion of the post-injected fuel is reduced while improving the combustion stability of this fuel.

Similarly, in this embodiment, during the active DeNO$_x$ control, the openings of the EGR valves 57 and 60 are controlled to be narrower than during the normal operation (i.e., in the case where the active DeNO$_x$ control is not executed), and during the DPF regenerating control, the EGR valve 60 is controlled to be fully closed (i.e., further narrower than during the active DeNO$_x$ control). Therefore, the various devices provided in the exhaust passage 40, such as the EGR cooler 58, are prevented from being blocked during the DPF regenerating control, and the amount of soot generated by the combustion of the post-injected fuel is reduced while improving the combustion stability of this fuel during the DeNO$_x$ control.

(4) Modifications

Although in the above embodiment, the case where the active DeNO$_x$ control and the DPF regenerating control following thereafter are executed when the engine body 1 is operated within the first range R1 is described, these controls may be executed outside the first range R1.

Further, although in the above embodiment, the case where the DeSO$_x$ starting amount which is used to determine the start of the DeSO$_x$ control is set larger than 0 is described, the DeSO$_x$ starting amount may be 0. In other words, the DeSO$_x$ control may be started after the PM accumulation amount of the DPF 44 becomes 0. Note that by setting the DeSO$_x$ starting amount larger than 0 as described above, the regeneration of the DPF 44 is also performable during the lean process of the DeSO$_x$ control, the execution time for the regenerating control of the DPF 44 is shortened and the required amount of fuel for combusting PM of the DPF 44 is reduced and the fuel efficiency is improved even more.

Further, although in the above embodiment, the second EGR valve 60 is fully closed during the DPF regenerating control is described, the second EGR valve 60 may be opened during the DPF regenerating control. Note that also in this case, since the post-injected fuel does not combust during the DPF regenerating control, in order to prevent the EGR cooler, etc. from being blocked, the opening of the second EGR valve 60 during the DPF regenerating control is preferably smaller than those during the normal operation the active DeSO$_x$ control and the enriching process of the DeNO$_x$ control. Additionally, the opening of the second EGR valve 60 may be different between the DeNO$_x$ control and the DeSO$_x$ control.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body (Engine)
2 Cylinder
6 Combustion Chamber
10 Fuel Injection Valve (Fuel Injector)
40 Exhaust Passage
41 NO$_x$ Catalyst
42 Oxidation Catalyst
44 DPF (PM filter)
200 PCM (Controller)

What is claimed is:

1. A control system for an engine, comprising:
   an engine body formed with a cylinder;
   a NO$_x$ catalyst provided in an exhaust passage through which exhaust gas discharged from the engine body flows, and configured to store NO$_x$ within the exhaust gas when an air-fuel ratio of the exhaust gas is lean, and reduce and release the stored NO$_x$ when the air-fuel ratio of the exhaust gas is close to a stoichiometric air-fuel ratio or rich;
   an oxidation catalyst provided integrally with the NO$_x$ catalyst or in the exhaust passage upstream of the NO$_x$ catalyst and configured to oxidize unburned fuel within the exhaust gas;
   a particulate matter (PM) filter provided in the exhaust passage downstream of the oxidation catalyst and configured to capture particulate matter within the exhaust gas;
   a fuel injector configured to perform a main injection in which fuel is injected into the cylinder to obtain an engine torque and a post injection in which fuel is injected into the cylinder at a timing later than the main injection; and
   a controller including a processor configured to execute:
      a DeNO$_x$ control in which the fuel injector is controlled to perform the main injection and the post injection so that the air-fuel ratio of the exhaust gas is brought close to the stoichiometric air-fuel ratio or becomes rich and the fuel supplied into the cylinder by the post injection combusts therein, and
      a filter regenerating control in which the fuel injector is controlled to perform the main injection and the post injection so that the air-fuel ratio of the exhaust gas becomes lean and the fuel supplied into the cylinder by the post injection causes no combustion therein, the controller executing the DeNO$_x$ control and the filter regenerating control consecutively in this order.

2. The control system of claim 1, wherein, after an amount of particulate matter accumulated in the PM filter falls below a given reference amount in the filter regenerating control, the controller executes a DeSO$_x$ control for alternately performing an enriching process in which the fuel injector is controlled to perform the main injection and the post injection so that the air-fuel ratio of the exhaust gas is brought close to the stoichiometric air-fuel ratio or becomes rich and the fuel supplied into the cylinder by the post injection combusts therein, and a lean process in which the fuel injector is controlled to perform the main injection and the post injection so that the air-fuel ratio of the exhaust gas becomes lean and the fuel supplied into the cylinder by the post injection causes no combustion therein.

3. The control system of claim 2, wherein the reference amount is set larger than zero.

4. The control system of claim 3, further comprising:
   an exhaust gas recirculation (EGR) passage communicating an intake passage configured to introduce intake air into the engine body, with the exhaust passage; and
   an EGR valve configured to open and close the EGR passage,
   wherein, during the enriching process of the DeSO$_x$ control, the controller controls an opening of the EGR valve to be narrower than in a case where the enriching process is not performed, and during the filter regenerating control, the controller controls the opening of the EGR valve to be further narrower than during the DeSO$_x$ control.

5. The control system of claim 2, further comprising:
   an exhaust gas recirculation (EGR) passage communicating an intake passage configured to introduce intake air into the engine body, with the exhaust passage; and
   an EGR valve configured to open and close the EGR passage,
   wherein, during the enriching process of the DeSO$_x$ control, the controller controls an opening of the EGR valve to be narrower than in a case where the enriching process is not performed, and during the filter regenerating control, the controller controls the opening of the EGR valve to be further narrower than during the $DeSO_x$ control.

6. The control system of claim 5, further comprising:

an exhaust gas recirculation (EGR) passage communicating an intake passage configured to introduce intake air into the engine body, with the exhaust passage; and an EGR valve configured to open and close the EGR passage, wherein, during the $DeNO_x$ control, the controller controls an opening of the EGR valve to be narrower than in a case where the $DeNO_x$ control is not executed, and during the filter regenerating control, the controller controls the opening of the EGR valve to be further narrower than during the $DeNO_x$ control.

7. The control system of claim 1, further comprising:

an exhaust gas recirculation (EGR) passage communicating an intake passage configured to introduce intake air into the engine body, with the exhaust passage; and an EGR valve configured to open and close the EGR passage, wherein, during the $DeNO_x$ control, the controller controls an opening of the EGR valve to be narrower than in a case where the $DeNO_x$ control is not executed, and during the filter regenerating control, the controller controls the opening of the EGR valve to be further narrower than during the $DeNO_x$ control.

8. A control system for an engine, comprising:

an engine body formed with a cylinder;

a $NO_x$ storage catalyst provided in an exhaust passage through which exhaust gas discharged from the engine body flows;

an oxidation catalyst provided integrally with the $NO_x$ catalyst or in the exhaust passage upstream of the $NO_x$ catalyst;

a filter provided in the exhaust passage downstream of the oxidation catalyst and configured to capture particulate matter;

a fuel injection valve configured to supply fuel into the cylinder; and a controller including a processor, connected to the fuel injection valve, and configured to output a control signal to the fuel injection valve, wherein, when a filter regeneration executing condition is determined as satisfied, the controller outputs the control signal to the fuel injection valve to execute a first fuel injection control in which an air-fuel ratio of the exhaust gas is brought close to the stoichiometric air-fuel ratio or rich by a main injection set according to an accelerator opening and a post injection in which the fuel is injected at a crank angle timing in an early half of expansion stroke, and when an amount of $NO_x$ stored in the $NO_x$ storage catalyst is determined to be smaller than a given value during the first fuel injection control, the controller outputs a control signal to the fuel injection valve to stop the first fuel injection control and execute a second fuel injection control in which the air-fuel ratio of the exhaust gas is brought to be lean by a main injection set according to the accelerator opening and a post injection in which the fuel is injected at a crank angle timing in a latter half of the expansion stroke.

9. The control system of claim 8, wherein the controller calculates a PM accumulation amount based on output signals of pressure sensors provided on upstream and downstream sides of the filter, respectively, and, when the PM accumulation amount exceeds a given value, the controller determines that the filter regeneration executing condition is satisfied.

10. The control system of claim 8, wherein the controller estimates a $NO_x$ reduction amount per unit time based on a post injection amount during the first fuel injection control, and an output value of a temperature sensor provided in the exhaust passage upstream of the $NO_x$ storage catalyst, and estimates a current $NO_x$ stored amount by subtracting the $NO_x$ reduction amount per unit time from a $NO_x$ stored amount obtained in a previously performed calculation.

* * * * *